(12) United States Patent
Nygaard

(10) Patent No.: US 9,217,465 B2
(45) Date of Patent: Dec. 22, 2015

(54) SLEWING APPARATUS

(75) Inventor: Stig André Nygaard, Arendal (NO)

(73) Assignee: Aker Pusnes AS, Arendal (NO)

( * ) Notice: Subject to any disclaimer, the term of this patent is extended or adjusted under 35 U.S.C. 154(b) by 315 days.

(21) Appl. No.: 13/820,010

(22) PCT Filed: Aug. 25, 2011

(86) PCT No.: PCT/EP2011/064609
§ 371 (c)(1),
(2), (4) Date: Apr. 17, 2013

(87) PCT Pub. No.: WO2012/028528
PCT Pub. Date: Mar. 8, 2012

(65) Prior Publication Data
US 2013/0202236 A1    Aug. 8, 2013

(30) Foreign Application Priority Data

Sep. 1, 2010 (NO) .................................. 20101218

(51) Int. Cl.
| | | |
|---|---|---|
| *F16C 19/18* | (2006.01) | |
| *F16C 39/02* | (2006.01) | |
| *B66D 1/30* | (2006.01) | |
| *F16C 19/52* | (2006.01) | |
| *F16C 19/06* | (2006.01) | |

(52) U.S. Cl.
CPC ................ *F16C 19/188* (2013.01); *B66D 1/30* (2013.01); *F16C 19/52* (2013.01); *F16C 39/02* (2013.01); *F16C 19/06* (2013.01); *F16C 2300/14* (2013.01)

(58) Field of Classification Search
CPC .............................. B65H 75/30; F16C 19/188

USPC ............ 242/394, 394.1, 397, 397.1, 398, 390, 242/596, 609, 611, 611.1, 612, 613
See application file for complete search history.

(56) References Cited

U.S. PATENT DOCUMENTS

| | | | | |
|---|---|---|---|---|
| 3,346,213 A | * | 10/1967 | Nelson | 242/390 |
| 3,952,961 A | * | 4/1976 | Antepenko | 242/421.8 |
| 6,527,215 B1 | * | 3/2003 | Cain et al. | 242/394 |
| 2005/0011848 A1 | * | 1/2005 | Rilbe et al. | 212/253 |

FOREIGN PATENT DOCUMENTS

| | | |
|---|---|---|
| DE | 1 920 895 A1 | 11/1970 |
| EP | 0 785 165 A1 | 7/1997 |

(Continued)

OTHER PUBLICATIONS

International Search Report issued in PCT/EP2011/064609 mailed on Nov. 18, 2011 (3 pages).
Written Opinion of the International Searching Authority issued in PCT/EP2011/064609 mailed on Nov. 18, 2011 (6 pages).

(Continued)

*Primary Examiner* — Emmanuel M Marcelo
*Assistant Examiner* — Angela Caligiuri
(74) *Attorney, Agent, or Firm* — Osha Liang LLP

(57) ABSTRACT

A slewing apparatus, comprising a slewing bearing means for the operation of a reel. A first slewing bearing (10) is configured to carry torsion and axial loads in the reel, while the second slewing bearing (20) is configured not to carry substantial torsion and axial loads in the reel. Thereby the second slewing bearing (20) functions as a back-up bearing for the reel, while the first slewing bearing (10) operates the reel and thus serves as the primary slewing bearing for the reel.

6 Claims, 4 Drawing Sheets

(56) References Cited

FOREIGN PATENT DOCUMENTS

| FR | 1 587 703 A | 3/1970 |
| GB | 2 381 814 A | 5/2003 |
| GB | 2 394 495 A | 4/2004 |
| JP | 59212507 A | 12/1984 |

OTHER PUBLICATIONS

Norwegian Search Report issed in U.S. Pat. No. 20101218 dated Apr. 1, 2011 (2 pages).
Patent Abstracts of Japan for Publication No. 59212507, Publication Date: Jan. 12, 1984 (1 Page).

* cited by examiner

SLEWING APPARATUS

CROSS-REFERENCE TO RELATED APPLICATIONS

This application is a national stage application of PCT/EP2011/064609, filed on Aug. 25, 2011, entitled "A SLEWING APPARATUS," which claims priority to Norwegian Patent Application No. 20101218, filed on Sep. 1, 2010. Each of these priority applications are incorporated herein by reference in their entireties.

FIELD OF THE PRESENT DISCLOSURE

This present disclosure relates to an offshore loading system for transferring hydrocarbon products via an offloading hose from a storage facility of a transport vessel such as a shuttle tanker. More specifically, this present disclosure relates to a slewing apparatus, comprising a slewing bearing means for the operation of a hose reel or similar which is rotatably supported by the slewing bearing means, the slewing bearing means being supported by a stationary structure.

BACKGROUND OF THE PRESENT DISCLOSURE

The production of hydrocarbons (e.g. crude oil and gas) from subsea reservoirs is facilitated by multiple large offshore production facilities located near one or more subsea wells.

Traditionally, the hydrocarbons have been transported from the offshore production facility to onshore storage facilities and further processing, via pipelines laid on the seabed. However, as hydrocarbons are being produced from reservoirs located in deeper and deeper waters and in regions where the seabed includes rough or uneven terrain such as steep cliffs and deep canyons, the use of seabed pipelines has become increasingly complex and prohibitively expensive.

Thus, a more economical and flexible system for transporting the hydrocarbons to onshore locations involve the use of offshore storage facilities at or near the production location, in combination with shuttle tankers. The offshore storage facility may comprise subsea storage cells integrated with a so-called Gravity Base Structure (GBS) platform or connected to a loading buoy of a fixed platform, or the offshore storage facility may be integrated in a so-called Floating Production, Storage and Offloading (FPSO) vessel which is maintained in position in a manner which is known in the art (e.g. moorings and/or thrusters controlled by dynamic positioning).

The hydrocarbons are transferred from the offshore storage facility (e.g. platform) to the carrier (e.g. a shuttle tanker) via a flexible transfer conduit, commonly referred to as a marine hose. When not in use, the hose is stored on a reel on the platform. Before commencing offloading of hydrocarbons, the flexible hose is paid out from the reel and connected to the shuttle tanker. When offloading is complete, the hose is disconnected from the tanker and reeled back onto the reel, in a manner known in the art.

Hose reels are commonly driven by a slew bearing assembly, i.e. a slewing gear rim (driven by one or more slewing motors) and a bearing raceway, connected to the reel and the reel stand, respectively, or vice versa. This mechanism is well known in the art.

Frequent use, with considerable torque and radial loads, cause wear and tear on the slew bearing assembly, and from time to time the assembly fails. Repairs, e.g. replacing the slewing gear rim or the bearing raceway, are often time consuming, causing expensive downtime for the platform.

SUMMARY OF THE PRESENT DISCLOSURE

The present disclosure is set forth and characterized in the main claims, while the dependent claims describe other characteristics of the present disclosure.

It is thus provided a slewing apparatus, comprising a slewing bearing means for the operation of a reel or similar which is rotatably supported by the slewing bearing means, the slewing bearing means being supported by a stationary structure and having a first slewing bearing, which is arranged to drive and operate the reel, and a second slewing bearing, which is arranged to freewheel and not carry any operational loads when the reel is operated by the first slewing bearing; further characterized by the first slewing bearing having a first slewing gear rim and a first bearing raceway configured for mutual relative movements, the first slewing gear rim being connected to one of the reel or the stationary structure, and the first bearing raceway being connected to the other one of the reel or the stationary structure; and the second slewing bearing having a second slewing gear rim and a second bearing raceway configured for mutual relative movements, the second slewing gear rim comprising means for connection to one of the reel or the stationary structure, and the second bearing raceway comprising means for connection to the other one of the reel or the stationary structure; and the second slewing gear rim thus may be connected to one of the reel or the stationary structure, while the second bearing raceway is not connected to the other one of the reel or the stationary structure;

whereby the first slewing bearing is operatively connected to the reel, while the second slewing bearing is not operatively connected to the reel.

In one embodiment, the first slewing bearing is configured to carry torsion and axial loads in the reel, while the second slewing bearing is configured not to carry substantial torsion and axial loads in the reel, whereby the second slewing bearing functions as a back-up bearing for the reel, while the first slewing bearing operates the reel and thus serves as the primary slewing bearing for the reel.

In one embodiment, the second slewing bearing is arranged radially within the first slewing bearing.

In one embodiment, the first slewing bearing comprises gear teeth extending radially outwards and the second slewing bearing comprises gear teeth extending radially inwards.

In one embodiment, the first slewing bearing and the second slewing bearing are arranged concentrically.

The operational loads comprise loads for driving and/or controlling the movements of the reel, and/or other loads imposed on the stationary structure by the reel.

BRIEF DESCRIPTION OF THE DRAWINGS

These and other characteristics of the present disclosure will be clear from the following description of one or more embodiments, given as a non-restrictive example, with reference to the attached schematic drawings wherein.

DETAILED DESCRIPTION OF THE PRESENT DISCLOSURE

Figure 1:
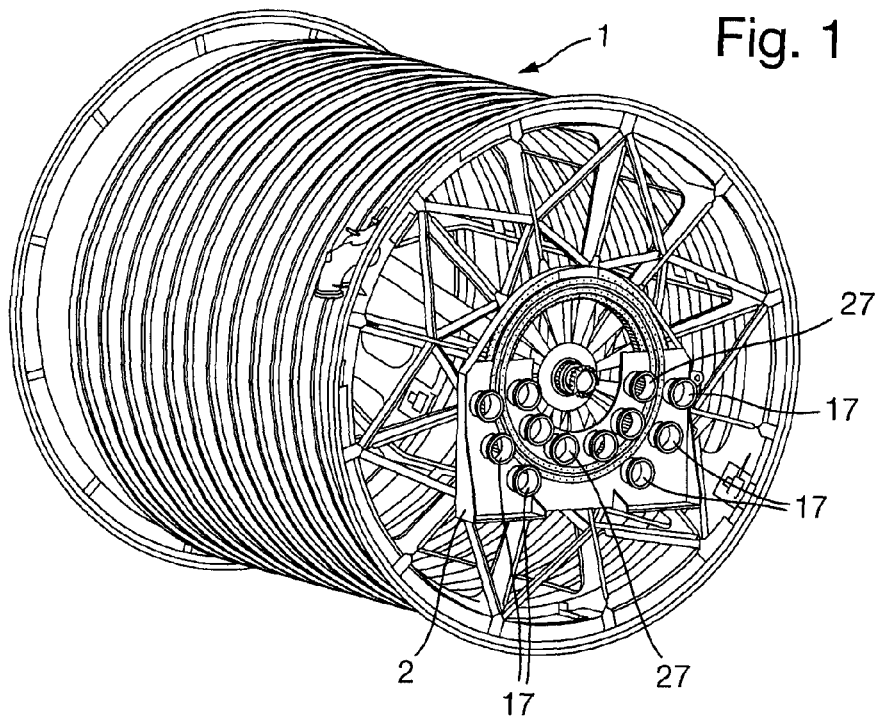
FIG. 1 is a perspective view of a reel, such as a hose reel, illustrating an embodiment of the drive apparatus according to the present disclosure.

FIG. 1 shows a reel 1, for example a reel for a marine hose. The reel 1 comprises a drum which is rotatably supported via a slewing bearing by a bearing bracket, which in turn is connected to a support surface, such as the deck of a platform. The reel 1 is rotated by the slewing drive mechanism (bearing) which is described below. The slewing drive mechanism is operated by slewing motors (not shown) arranged in the receptacles 17, 27 in a motor mount 2. The bearing brackets and slewing motors as not shown in FIG. 1, as these components are well known in the art and need not be shown in order for the present disclosure to be elucidated.

Figure 2:
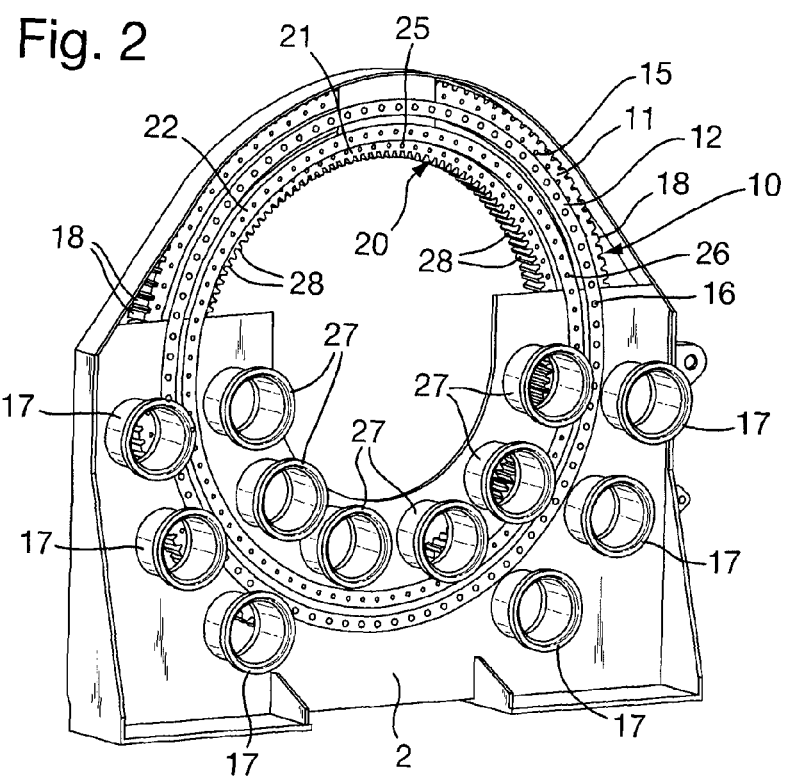
FIG. 2 is a perspective view an embodiment of the drive apparatus according to the present disclosure.

FIG. 2 is a close-up view of the drive mechanism shown in FIG. 1, but without the reel. The drive mechanism comprises a first slewing bearing 10 and a second slewing bearing 20, arranged concentrically with and within the first slewing bearing 10.

The first (outer) slewing bearing 10 comprises an outer slewing gear rim 11, having outer teeth 18 facing radially outwards, and an outer bearing raceway 12. The outer slewing gear rim 11 is in the illustrated embodiment connected to the reel (not shown in FIG. 2) via bolts 15 and the outer bearing raceway 12 is connected to a bearing bracket (not shown in FIG. 2) via bolts 16.

The second (inner) slewing bearing 20 comprises an inner slewing gear rim 21, having inner teeth 28 facing radially inwards, and an inner bearing raceway 22. The inner slewing gear rim 21 is in the illustrated embodiment connected to the reel (not shown in FIG. 2) via bolts 25, but the inner bearing raceway 22 is not connected to the bearing bracket. The inner bearing raceway 22 is, however, furnished with holes 26 for such a purpose.

FIG. 2 also shows the motor mount 2 and receptacles 17 for slewing motors (not shown) for engaging the outer teeth 18 and, similarly, receptacles 27 for slewing motors (not shown) for engaging the inner teeth 28. FIG. 2 shows six receptacles per bearing; this number may be increased or decreased depending on the power requirements for the reel.

Figure 3:
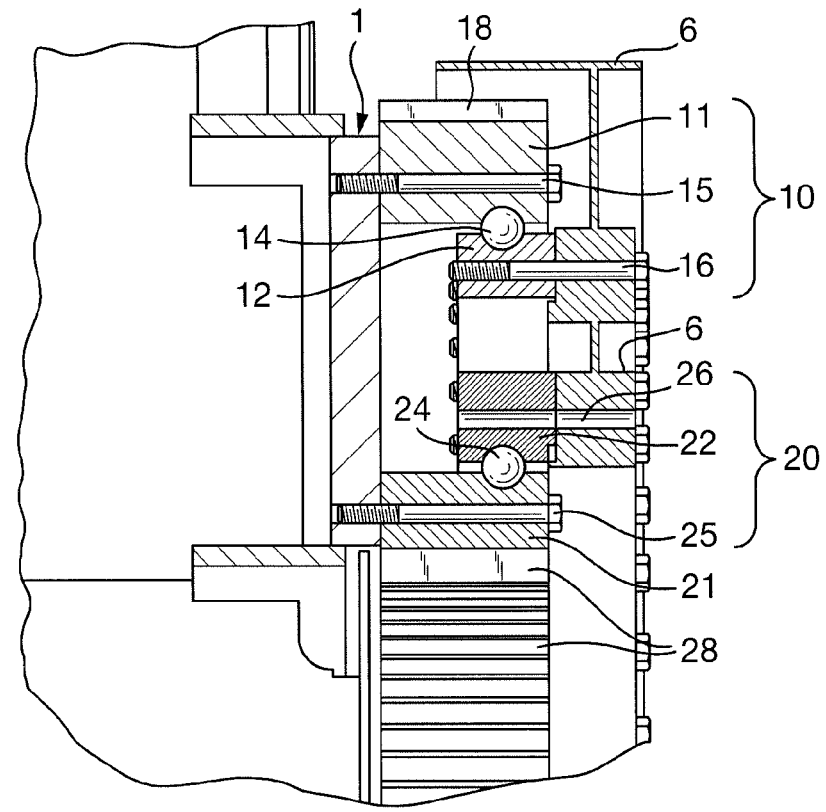
FIG. 3 is a cross-section through an embodiment of the drive apparatus according to the present disclosure, in a first state of operation.

FIG. 3 is a cross-section through the first (outer) slewing bearing 10 and the second (inner) slewing bearing 20.

As described above with reference to FIG. 2, the outer slewing gear rim 11, having outer teeth 18 facing radially outwards, is connected to the reel 1 (only partly shown in FIG. 3) by bolts 15 (only one shown in FIG. 3). The outer bearing raceway 12 is connected to a bearing bracket 6 (only partly shown in FIG. 2) via bolts 16 (only one shown in FIG. 3). The bearing bracket 6 is connected to e.g. a deck structure, in a manner which is known in the art. The outer slewing gear rim 11 and the outer bearing raceway 12 are movable with respect to one another, and an outer roller bearing 14 is arranged between these two parts, in a known fashion.

The second slewing bearing 20, which is arranged radially inside of the first slewing bearing 10, comprise parts that in principle are similar to the first slewing bearing. As described above with reference to FIG. 2, the inner slewing gear rim 21, having inner teeth 28 facing radially inwards, is connected to the reel 1 (only partly shown in FIG. 3) by bolts 25 (only one shown in FIG. 3). The inner slewing gear rim 21 and the inner bearing raceway 22 are movable with respect to one another, and an inner roller bearing 24 is arranged between these two parts, in a known fashion.

The inner bearing raceway 22 is in the illustrated embodiment not connected to the bearing bracket 6. An aperture 26 extending through the inner bearing raceway 22 and into the bearing bracket 6 will, however, make such connection possible.

In the operation of the drive apparatus as illustrated by FIGS. 2 and 3, slewing motors (not shown) are provided in some or all of the outer motor receptacles 17 in order to drive the reel 1 by engagement with the outer teeth 18. As there is no connection between the inner bearing raceway 22 and the bearing bracket 6, the outer slewing bearing 10 is the primary bearing, whereas the inner slewing bearing 20 is a secondary bearing. That is, torsion and radial loads introduced by the slewing motors and/or imposed on the reel by the hose, are carried by the outer slewing bearing 10, thereby relieving the inner slewing 20 bearing from wear and tear.

Figure 4:
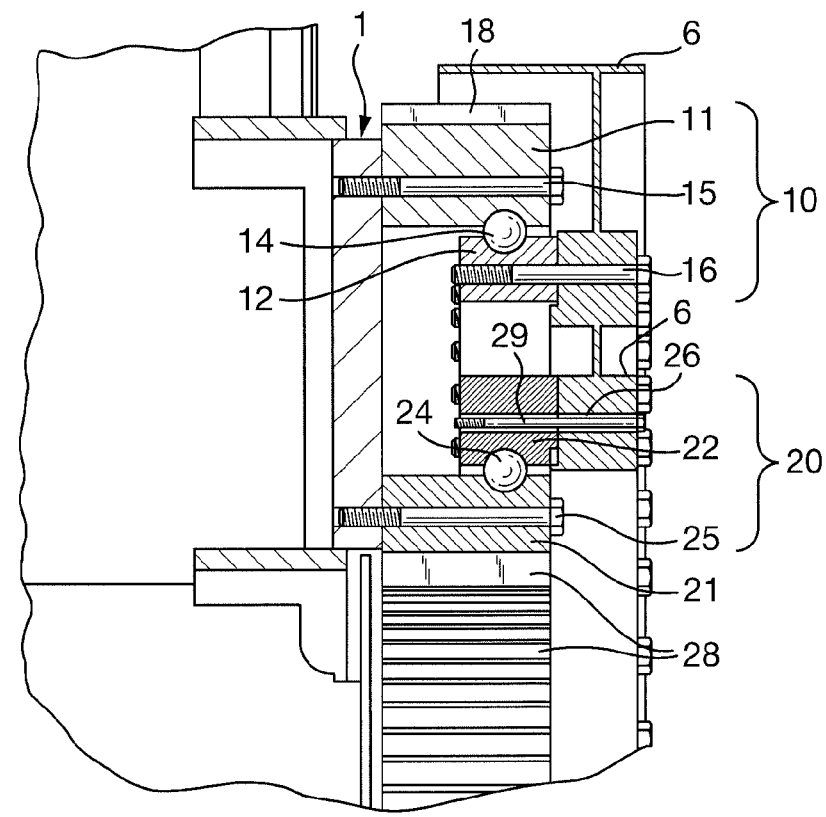
FIG. 4 shows a variant of the embodiment illustrated in FIG. 3.

In operation of the reel over an extended period of time, and particularly if the reel is operating in corrosive or dusty environments, it is considered beneficial to move the inner bearing raceway 22 with respect to the inner slewing gear rim 21 (at least from time to time) in order to avoid corrosion and fouling. Therefore, the inner bearing raceway 22 may be connected to the bearing bracket 6 in a manner which transfers torsion but no radial loads. FIG. 4 illustrates this situation, where a bolt 29 is extended into the aperture 26; the bolt 29 having a diameter considerably smaller that the diameter of the aperture 26.

Figure 5:
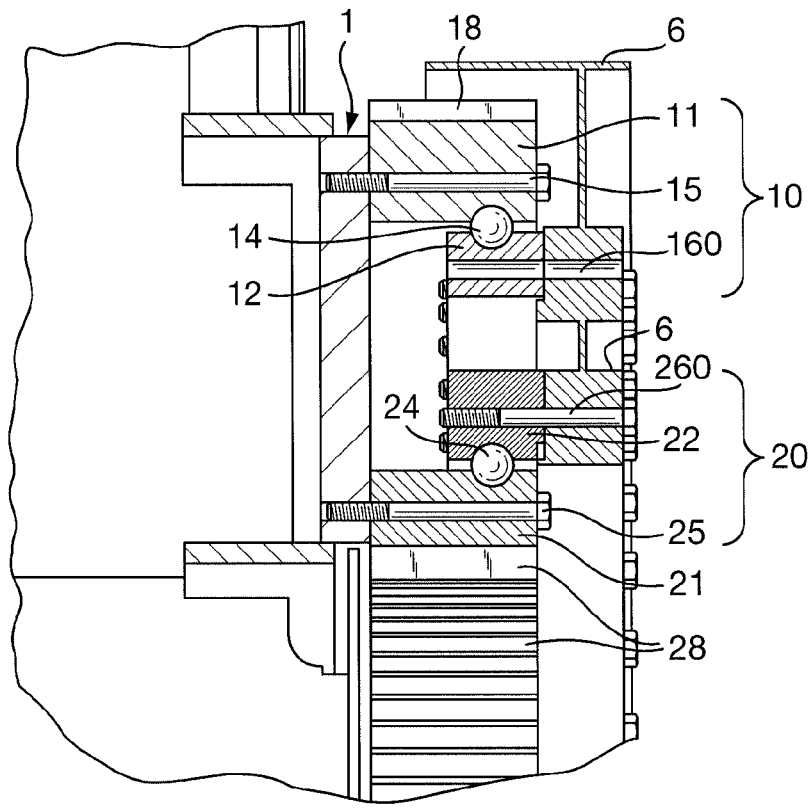
FIG. 5 is a cross-section through an embodiment of the drive apparatus according to the present disclosure, in a second state of operation.

If the outer (primary) slewing bearing 10 is damaged during operation, the inner slewing bearing 20 may be turned into becoming the primary slewing bearing by inserting bolts into the apertures 26 and removing the bolts 16. This situation is illustrated by FIG. 5, where a bolt 260 is inserted in the aperture 16, and the bolt 16 (see FIG. 4) has been removed from the aperture 160. The slewing motors may then removed from the outer receptacles 17 and inserted into the inner receptacles 27, whereupon the reel is driven by motors' interaction with the inner teeth 28.

The apparatus according to the present disclosure therefore provides redundancy, in that the inner slewing bearing 20 serves as a back-up, in case the outer slewing bearing 10 fails.

Figure 6:
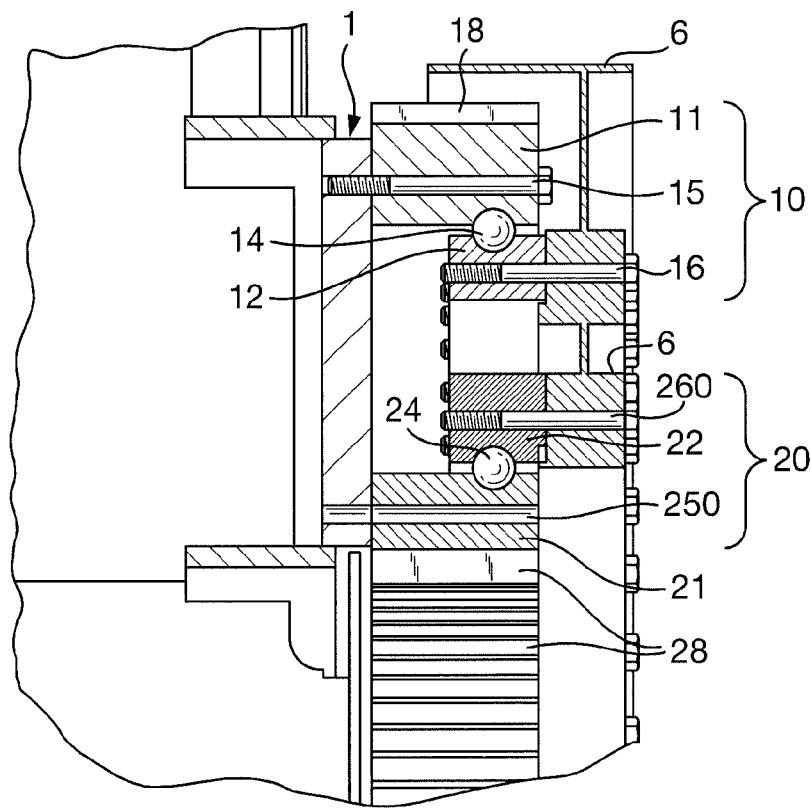
FIG. 6 is a cross-section through an embodiment of the drive apparatus according to the present disclosure, in a third state of operation.

FIG. 6 shows a configuration which is technically equivalent to that of FIG. 3: The outer slewing bearing 10 is the primary bearing, while the inner slewing bearing 10 is inactive (secondary bearing). In FIG. 6, however, the inner bearing raceway 22 is connected to the bracket 6, while the inner slewing gear rim 21 is not connected to the reel 1. The aperture 250 is empty.

Figure 7:
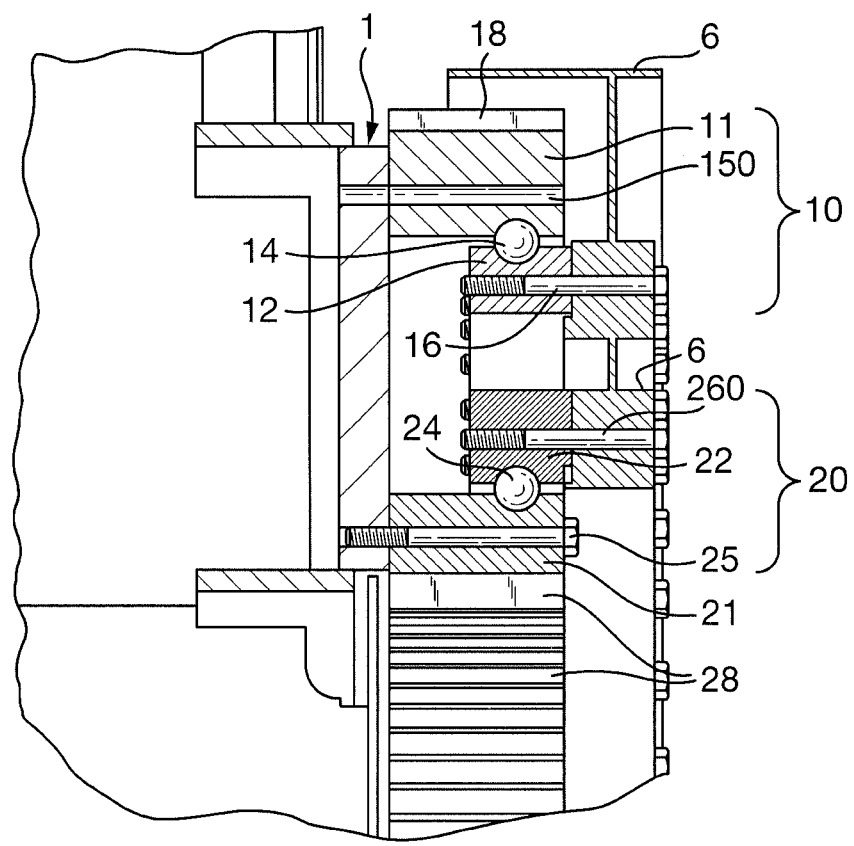
FIG. 7 is a cross-section through an embodiment of the drive apparatus according to the present disclosure, in a fourth state of operation.

FIG. 7 shows a configuration which is technically equivalent to that of FIG. 5: The inner slewing bearing 20 is the primary bearing, while the outer slewing bearing 20 is inactive (secondary bearing). In FIG. 7, however, the outer bearing raceway 12 is connected to the bracket 6, while the outer slewing gear rim 11 is not connected to the reel 1. The aperture 150 is empty.

Retention devices similar to the undersized bolt 29 described above with reference to FIG. 4, may also be used in the secondary bearings in the variants shown in FIGS. 5, 6 and 7.

Although the description of the above embodiments refers to a hose reel, the skilled person understands that the present disclosure is equally applicable to reels for other objects, and for slewing bearings in general.

The invention claimed is:

1. A slewing apparatus, comprising a slewing bearing means for the operation of a reel that is rotatably supported by the slewing bearing means, the slewing apparatus being configured to be connected to one axial side of the reel, the slewing bearing means supported by a stationary structure, and having a first slewing bearing that is arranged to drive and operate the reel, and a second slewing bearing that is arranged to freewheel and not carry any operational loads when the reel is operated by the first slewing bearing, wherein the first slewing bearing has a first slewing gear rim and a first bearing raceway configured for mutual relative movements,
the first slewing gear rim connected to one of the reel or the stationary structure, and
the first bearing raceway connected to the other one of the reel or the stationary structure; and wherein the second slewing bearing has a second slewing gear rim and a second bearing raceway configured for mutual relative movements,
the second slewing gear rim comprising means for connection to one of the reel or the stationary structure,
the second bearing raceway comprising means for connection to the other one of the reel or the stationary structure; and
the second slewing gear rim thus configured to be connected to one of the reel or the stationary structure, while the second bearing raceway is not connected to the other one of the reel or the stationary structure;

whereby the first slewing bearing is operatively connected to the reel, while the second slewing bearing is not operatively connected to the reel.

2. The slewing apparatus of claim 1, wherein the first slewing bearing is configured to carry torsion and axial loads in the reel, while the second slewing bearing is configured not to carry substantial torsion and axial loads in the reel, whereby the second slewing bearing functions as a back-up bearing for the reel, while the first slewing bearing operates the reel and thus serves as the primary slewing bearing for the reel.

3. The slewing apparatus of claim 1, wherein the second slewing bearing is arranged radially within the first slewing bearing.

4. The slewing apparatus of claim 1, wherein the first slewing bearing comprises gear teeth extending radially outwards and the second slewing bearing comprises gear teeth extending radially inwards.

5. The slewing apparatus of claim 1, wherein the first slewing bearing and the second slewing bearing are arranged concentrically.

6. The slewing apparatus of claim 1, wherein the operational loads comprise at least one of loads for at least one of driving or controlling the movements of the reel or other loads imposed on the stationary structure by the reel.

* * * * *